United States Patent
Zhang

(10) Patent No.: US 10,778,769 B2
(45) Date of Patent: Sep. 15, 2020

(54) ELASTIC CLOUD STORAGE ON MULTIPLE LOCATIONS

(71) Applicant: Citrix Systems, Inc., Fort Lauderdale, FL (US)

(72) Inventor: Jun Zhang, Nanjing (CN)

(73) Assignee: Citrix Systems, Inc, Fort Lauderdale, FL (US)

( * ) Notice: Subject to any disclaimer, the term of this patent is extended or adjusted under 35 U.S.C. 154(b) by 29 days.

(21) Appl. No.: 16/044,942

(22) Filed: Jul. 25, 2018

(65) Prior Publication Data

US 2020/0036788 A1 Jan. 30, 2020

(51) Int. Cl.
*H04L 29/08* (2006.01)
*H04L 29/06* (2006.01)

(52) U.S. Cl.
CPC .......... *H04L 67/1097* (2013.01); *H04L 63/08* (2013.01); *H04L 67/18* (2013.01); *H04L 67/20* (2013.01); *H04L 67/306* (2013.01)

(58) Field of Classification Search
CPC ..... H04L 67/1097; H04L 67/20; H04L 67/18; H04L 63/08; H04L 67/306
See application file for complete search history.

(56) References Cited

U.S. PATENT DOCUMENTS

| | | | |
|---|---|---|---|
| 2004/0133731 A1* | 7/2004 | Sorrentino | G06F 12/0871 711/100 |
| 2008/0147821 A1* | 6/2008 | Dietrich | G06F 16/1834 709/216 |
| 2012/0272025 A1 | 10/2012 | Park et al. | |
| 2012/0303736 A1 | 11/2012 | Novotny et al. | |
| 2013/0347025 A1* | 12/2013 | Prakash | H04N 21/2541 725/25 |
| 2015/0154418 A1 | 6/2015 | Redberg | |
| 2016/0021185 A1 | 1/2016 | De Sene et al. | |
| 2017/0331893 A1* | 11/2017 | Crofton | H04L 67/1097 |

OTHER PUBLICATIONS

International Search Report and Written Opinion for International Appl. No. PCT/US2019/042632, dated Oct. 9, 2019.

* cited by examiner

*Primary Examiner* — Michael A Keller
(74) *Attorney, Agent, or Firm* — Foley & Lardner LLP

(57) ABSTRACT

Described embodiments provide systems and methods of managing storage of data of a user across storage service providers. A storage service may receive a request to store data by a user. The storage service may communicate with storage service providers and may maintain storage vectors for each storage service provider. The storage service may identify a policy for the user. The policy may specify usage of the storage service providers based on a user profile. The storage service may determine, based on the policy, storage service providers to use to store the data of the user. The storage service may store a first portion of the data to a first storage vector of a first storage service provider. The storage service may store a second portion of the data to one of a second storage vector of a second storage service provider or a storage of the storage service.

18 Claims, 3 Drawing Sheets

ELASTIC CLOUD STORAGE ON MULTIPLE LOCATIONS

FIELD OF THE DISCLOSURE

The present application generally relates to data storage, including but not limited to systems and methods for managing storage of data of a user across a plurality of third-party public storage service providers.

BACKGROUND

Data may be stored and maintained on a data storage managed by a file hosting service. The data storage may span multiple servers distributed across multiple locations. A user on a client in one location may upload the data onto the data storage of a server located in a different location.

BRIEF SUMMARY

A data storage service provider may administer and maintain a multitude of data storage units. Each data storage unit may be operated from one or more servers managed by the data storage service provider. In cloud-based data storage systems, the data storage units may be emulated using a virtualized infrastructure, with a data storage unit implemented over multiple physical servers. The servers may be physically distributed across a variety of locations around the world. A user on a client located in one location may access the data storage unit to upload new data for remote storage or retrieve stored data for use. With more and more users spread throughout different locations and regions accessing such data storage units, the data storage service providers may experience more severe strains in allocation of computing resources and may become more vulnerable to security lapses. For one, a number of users in a certain region may dramatically increase unexpected. For another, the physical data center infrastructure serving users may be located remote form the client and may depend on network connections through multiple regions.

The culmination of these factors may lead to degradation in performance of the services supported by the data storage service providers, giving rise to at least three difficult problems. First, the data storage service provider may have difficulty in anticipating user demand in services. The demand and usage of the services supported by the data storage service provider may be dynamic, and may increase or decrease much faster than expected. To ensure quality of service, the data storage service provider may set aside redundant storage capacity at all times, with excess under-utilized computing capacity during low demand. As a result, there may be a sub-optimal allocation of computing resources to handle the fluctuations in user demand. Secondly, it may be challenging for the data storage service provider to prevent security lapses to the data center. Malevolent parties may attempt to exploit system vulnerabilities in the software (e.g., application, operating system, and hypervisor) as well as in the hardware (e.g., processor and memory) of the data storage service provider. Any defect in the software or hardware may result in leakage of user data. Because the data center infrastructure may be spread across multiple locations, the number of potential vulnerabilities may increase. Thirdly, user experience of the data storage service provider may worsen from a slowdown in services. For users located in a region different from the physical data center, the experience may be highly dependent on connectivity and speed of the network connections between the client of the user and the servers in the data center. This issue may be exacerbated when the communications traverse through a several networks from the client and the servers.

To surmount the technical challenges faced by data storage service providers, the present systems and methods may provide a robust, secured, elastic cloud storage access. A storage service may leverage an enterprise data storage service provider as well as third-party data service providers to increase an amount of potentially allocable storage capacity. The third-party data service providers may include public cloud storage service providers as virtual storage vectors. The storage service may coordinate the enterprise data storage provider and the third-party data service providers as a storage bundle. For any user of the storage service, the data from the user may be stored in a storage bundle and may be distributed to each storage vector in the backend. The data in the storage bundle distributed across the storage vectors may be in accordance with a redundant array of independent disks (RAID) configuration (e.g., at RAID level 5). The data in this configuration may be encrypted, and may not be used directly as a result. In addition, as the physical infrastructure of each data service provider may be configured differently, the likelihood of breaching the security protection of the user data may be reduced, as a malevolent entity would have to successfully contravene each of the infrastructures to access the data. Furthermore, as the cloud storage vectors may have physical infrastructure located across the globe in different regions, the number of networks traversed between the client of the user and the nearest data center may be reduced. As a consequence, the end user access to the storage bundle may be faster and more reliable. Additionally, if any of the third-party storage service providers becomes out of service, the storage vector thereon may be migrated to another vector, thereby allowing data to be restored quickly.

Schematically, the storage service may have a policy manager to determine whether to provide the user access to the third-party storage service provider based on a user profile for the user. The user profile may include a physical location of the user, a requested storage size, and user settings, among others. If the location of the user is the same as the location of the storage service, the policy manager may serve the user directly. If the storage service is close to or out of capacity, the policy manager may select one of the third-party storage service providers. Moreover, if the location of the user differs from the location of the storage service, the policy manager may select one of the third-party storage service providers to serve the user to leverage an external storage vector. The storage service may include an access controller to interface the storage service with the third-party storage service providers. When one of the third-party storage service providers is selected, the access controller may again access to the third-party storage service provider using authentication credentials of the user. The access control may maintain the authentication credentials for the user across the third-party storage service providers.

In addition, the storage service may also have a storage manager to read and write to the storage vectors in the third-party storage service providers. Having obtained access to the third-party storage service provider via the authentication credentials of the user, the storage manager may read from and write to the storage vectors of the third-party storage service provider. To write new data onto the storage vector, the storage manager may encrypt the data and split the data into portions to distribute across the storage vectors of the third-party storage service provider.

To read data from the storage vector, the storage manager may retrieve the storage vectors of the third-party storage service provider and assemble the data from the storage vectors. The storage manager may also read from and write to storage vectors of the enterprise storage service. In addition, the storage service may further include an exception handler to perform countermeasures to any unavailability among the third-party storage service providers. The exception handler may detect an outage in a storage vector or removal of the third-party service provider. Upon detection, the exception handler may move the content on the storage vector or maintained by the third-party service provider to another storage vector.

At least one aspect of this disclosure is directed to a method of managing storage of data of a user across a plurality of third party public storage service providers. A storage service may receive a request to store data by a user. The storage service may communicate with a plurality of third party public storage service providers and may maintain a plurality of storage vectors for each of the plurality of third party public storage service providers. The storage service may identify a policy for the user. The policy may specify usage of one or more of the plurality of third party public storage service providers based at least on a profile of the user. The storage service may determine, based at least on the policy, one or more third party public storage service providers of the plurality of third party public storage service providers to use to store the data of the user. The storage service may store a first portion of the data to a first storage vector of a first third party public storage service provider of the one or more third party public storage service providers. The storage service may store a second portion of the data to one of a second storage vector of a second third party public storage service provider of the one or more third party public storage service providers or a storage of the storage service.

In some embodiments, a storage vector of the plurality of storage vectors may identify one of a location, address or a size of a unit of storage of a respective third party public storage service provider. In some embodiments, identifying the policy for the user may include identifying from the profile of the user one of a location of the user, storage size assigned to or requested by the user, or preferences of the user. In some embodiments, determining the one or more third party public storage service providers may include selecting a third party public storage service provider from the plurality of third party public storage service providers based at least on the location of the user. In some embodiments, one of the first portion of the data or the second portion of the data may include one of striped data or mirrored data in association with a respective redundant array of independent disk (RAID) level.

In some embodiments, the storage service may obtain one of authentication credentials or an address for one of the first storage vector or the second storage vector. In some embodiments, the storage service may store the first portion of the data in encrypted form to the first storage vector and the second portion of the data in encrypted form to the second storage vector. In some embodiments, the storage service may store the data across different storage vectors across the one or more third party public storage service providers. In some embodiments, the storage service may receive a second request to access the data and responsive to the second request identifying the storage vectors for the data. In some embodiments, the storage service may obtain different portions of the data across the storage vectors of the one or more third party public storage service providers and combining the different portions of the data to provide as a response to the second request.

At least one aspect of this disclosure is directed to a system for managing storage of data of a user across a plurality of third party public storage service providers. The system may include a storage service executable on one or more processors and coupled memory. The storage service may communicate with a plurality of third party public storage service providers and maintain a plurality of storage vectors for each of the plurality of third party public storage service providers. The storage service may receive a request to store data by a user. The storage service may identify a policy for the user. The policy may specify usage of one of more of the plurality of third party public storage service providers based at least on a profile of the user. The storage service may determine, based at least on the policy, one or more third party public storage service providers of the plurality of third party public storage service providers to use to store the data of the user. The storage service may store a first portion of the data to a first storage vector of a first third party public storage service provider of the one or more third party public storage service providers. The storage service may store a second portion of the data to one of a second storage vector of a second third party public storage service provider of the one or more third party public storage service providers or a storage of the storage service.

In some embodiments, a storage vector of the plurality of storage vectors may identify one of a location, address or a size of a unit of storage of a respective third party public storage service provider. In some embodiments, the profile of the user may identify one of a location of the user, storage size assigned to or requested by the user, or preferences of the user. In some embodiments, the storage service may select a third party public storage service provider from the plurality of third party public storage service providers based at least on the location of the user. In some embodiments, one of the first portion of the data or the second portion of the data comprises one of striped data or mirrored data in association with a respective redundant array of independent disk (RAID) level.

In some embodiments, the storage service may obtain one of authentication credentials or an address for one of the first storage vector or the second storage vector. In some embodiments, the storage service may store the first portion of the data in encrypted form to the first storage vector and the second portion of the data in encrypted form to the second storage vector. In some embodiments, the storage service may store the data across different storage vectors across the one or more third party public storage service providers. In some embodiments, the storage service may receive a second request to access the data and responsive to the second request identifying the storage vectors for the data. In some embodiments, the storage service may obtain different portions of the data across the storage vectors of the one or more third party public storage service providers and combining the different portions of the data to provide as a response to the second request.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
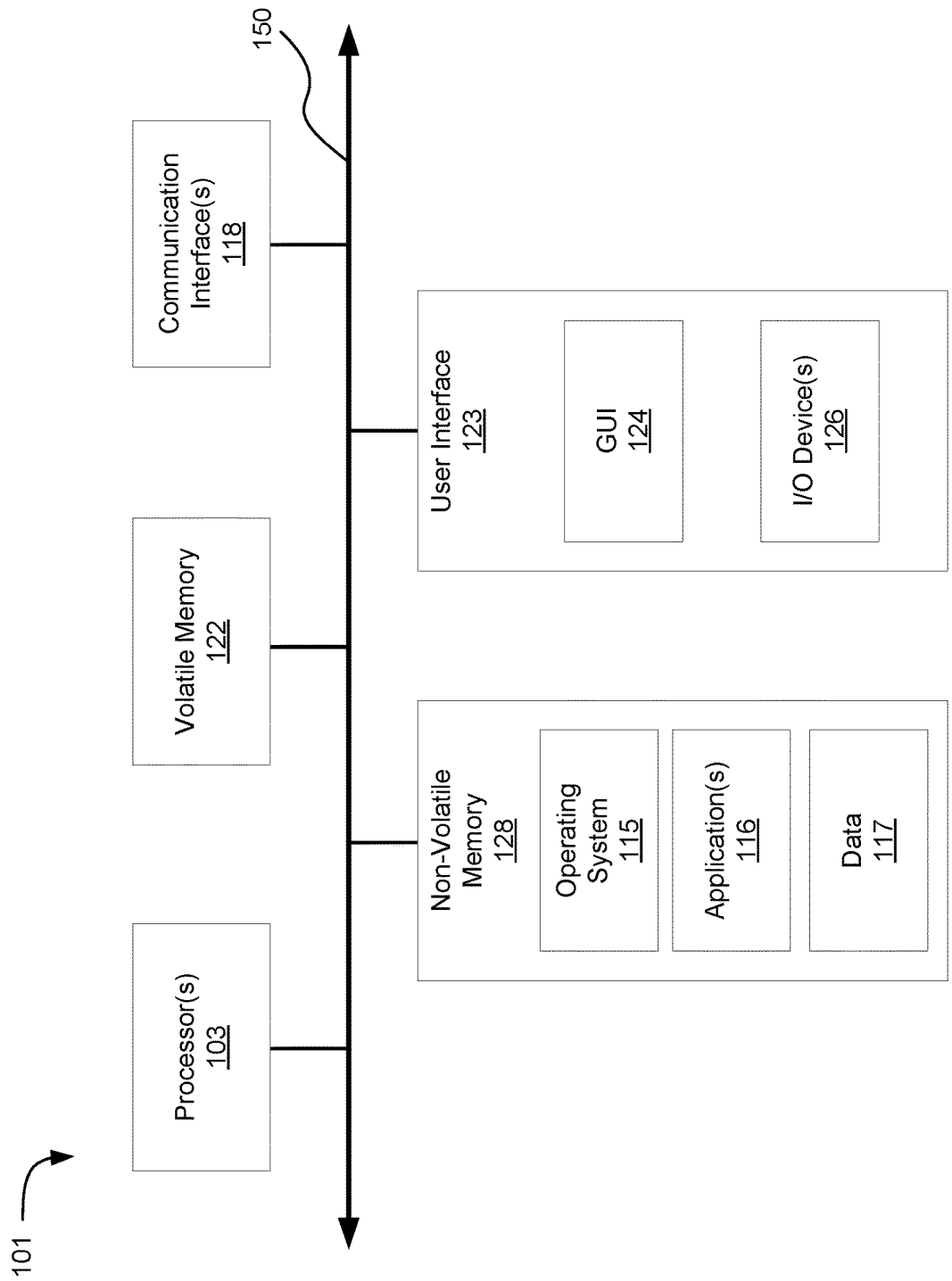
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for managing storage of data of a user across a plurality of third-party public storage service providers.

A. Computing Environment

Prior to discussing the specifics of embodiments of the systems and methods detailed herein in Section B, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

Figure 2:
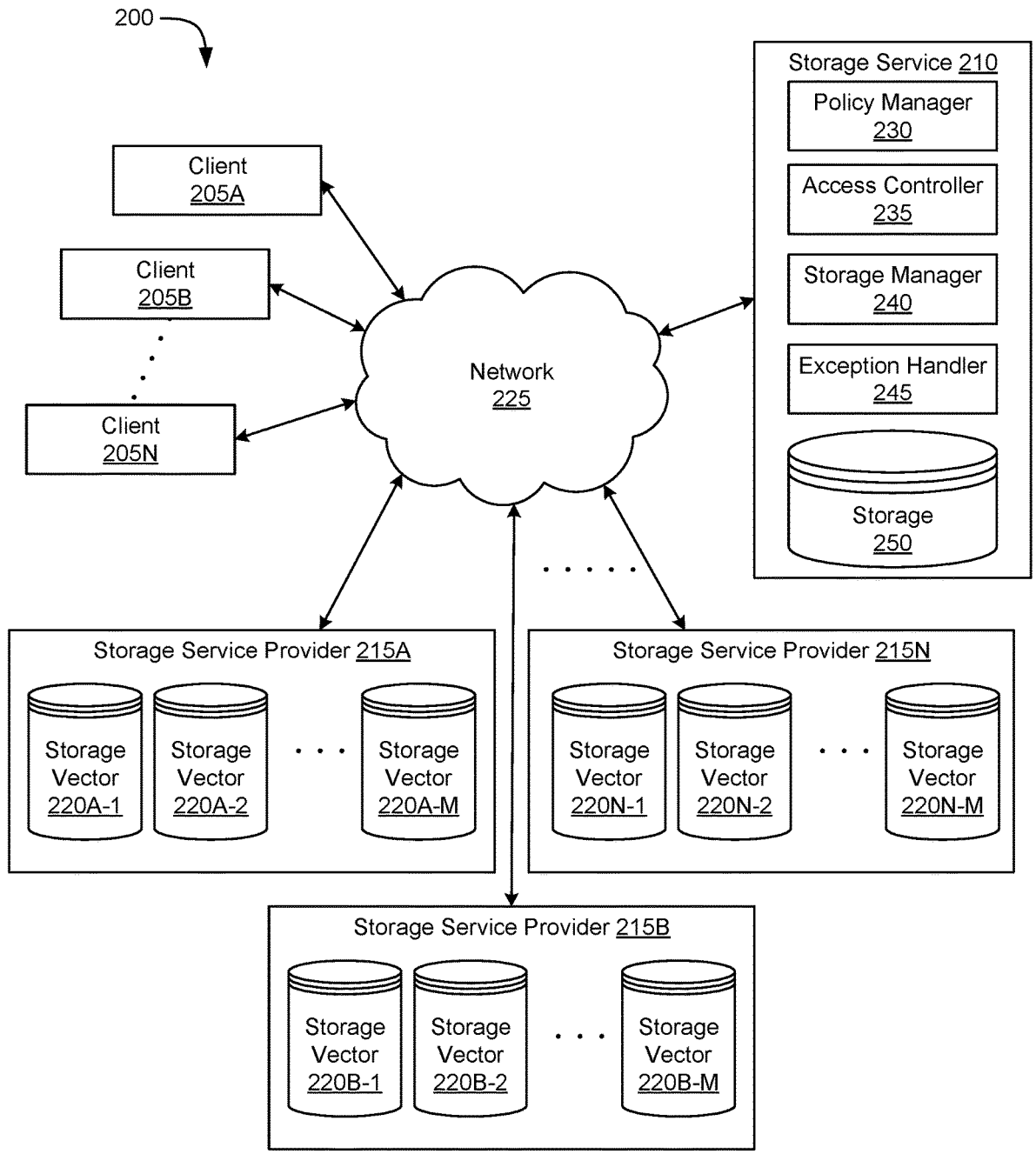
FIG. 2 is a block diagram of an example embodiment of a system for managing storage of data of a user across a plurality of third-party public storage service providers.

B. Systems and Methods for Managing Storage of Data of a User Across a Plurality of Third-Party Public Storage Service Providers Referring now to FIG. 2, depicted is a block diagram of an example embodiment of a system 200 for managing storage of data of a user across a plurality of third-party public storage service providers. In overview, the system 200 may include one or more clients 205A-N (hereinafter generally referred to as client 205), at least one storage service 210, and one or more storage service providers 215A-N (hereinafter generally referred to as the storage service provider 215), among others. The one or more clients 205, the storage service 210, and the one or more storage service providers 215 may be in communication with one another via a network 225. In some embodiments, the network 225 may be a public network (e.g., the Internet) connecting the one or more clients 205, the storage service 210, and the one or more storage service providers 215. In some embodiments, the one or more clients 205 and the storage service 210 may be connected to each other via one network 225 and the storage service 210 and the one or more storage service providers 215 may be connected to one another via another network 225.

The storage service 210 may interface between the clients 205 and the one or more service providers 215, and may manage requests to access data maintained by the one or more storage service providers 215 from the one or more clients 205. In some embodiments, the storage service 210 may itself be an enterprise storage service provider. The storage service 210 may include at least one policy manager 230 to identify a policy to apply to a request to access data from the client 205. The storage service 210 may include at least one access controller 235 to authenticate access of data maintained by the one or more storage service providers 215. The storage service 210 may include at least one storage manager 240 to read from and write data on the one or more storage service providers 215. The storage service 210 may include at least one exception handler 245 to perform any countermeasures to unavailability among the one or more storage service providers 215. The storage service 210 may include at least one storage 250 to store and maintain data from the clients 205. In some embodiments, the storage 250 may include one or more storage vectors.

Each storage service provider 215 may store and maintain data received from the clients 205 via the storage service 210. The storage service providers 215 may be a file hosting service, a cloud storage service, or a remote backup storage service, among others. In some embodiments, at least one of the storage service providers 215 may be a third-party storage service provider providing permission to interface and access data with the storage service provider 210. In some embodiments, at least one of the storage service providers 215 may be an enterprise storage service provider associated with the storage service 210. For example, the first storage service provider 215A may be associated with the enterprise storage service provider, whereas the second storage service provider 215B may be the third-party storage service provider. Each storage service provider 215 may be maintained in, situated at, or otherwise associated with one or more physical infrastructure (e.g., data centers, branch offices, and remote offices). Each physical infrastructure may be physically situated on a geographic region or location. The storage service provider 215 may keep track or identify the location, an address, and a total size of storage, among others. The location may include a geographic region or a position of the storage service provider 215, and may be identified using a physical address or geographic coordinates. The address may identify a network address of the storage service provider 215, such an Internet Protocol (IP) address or media access control (MAC) address. The total size of storage may identify a storage capacity of the storage service provider 215. In some embodiments, the storage service provider 215 may also identify a total available storage space.

Each storage service provider 215 may include one or more storage service vectors 220A-1 to 220N-M (hereinafter generally referred to storage vector 220) for storing and maintaining data. In some embodiments, each storage vector 220 may be part of a file hosting service, a cloud storage service, or a remote backup storage service, among others. In some embodiments, each storage vector 220 may store and maintain the data in accordance to the specifications and protocols of the respective storage service provider 215. Each storage vector 220 may be maintained in, situated at, or otherwise associated with a geographic region or location as the physical infrastructure. Each storage vector 220 may keep track or identify the location, an address, and a size of storage unit of the storage vector 220, among others. The location may include a geographic region or a position of the storage vector 220, and may be identified using a physical address or geographic coordinates. In some embodiments, for the same storage service provider 215, one set of storage vectors 220 may be situated in a geographic region or location different from another set of storage vectors 220. The address may identify a network address of the storage vector 220, such an Internet Protocol (IP) address or media access control (MAC) address. The total size of storage may identify a storage capacity of the storage vector 220. In some embodiments, the storage vector 220 may also identify a total available storage space. Each storage vector 220 may maintain and store data received from the clients 205 via the storage service 210. Each storage vector 220 may be maintained by the storage service 210.

Each of the above-mentioned elements or entities is implemented in hardware, or a combination of hardware and software, in one or more embodiments. Each component of the system 200 may be implemented using hardware or a combination of hardware or software detailed above in connection with FIG. 1. For instance, each of these elements or entities can include any application, program, library, script, task, service, process or any type and form of executable instructions executing on hardware of the client 205, the storage service 210 (including the policy manager 230, the access controller 235, the storage manager 240, the exception handler 245, and the storage 250), and the storage service providers 215 (including the storage vectors 220). The hardware can include circuitry such as one or more processors in one or more embodiments.

On the storage service 210, the policy manager 230 may receive a request to store data or a request to access data by a user from the client 205. The request may include an indicator specifying whether the request is to store data or to access data. The request to store data may include one or more files from the client 205 to upload via the storage service 210. In some embodiments, the request to store data may include one or more file identifiers corresponding to files accessible by the client 205 to upload. In uploading the files for storage, the file identifier may include a filename of the file, including a host referencing the device storing the file, a drive, a path (e.g., directory), a base name, and an extension, among others. For example, the user of the client 205 may select files stored on a different device or server to upload via the storage service 215. In some embodiments, the one or more files may be selected by the user of the client 205 via a graphical user interface (e.g., a file system directory) for uploading of files via the storage service 210. Conversely, the request to access data may include one or more file identifiers corresponding to files stored and maintain by the storage service 210. In retrieving the file, the file identifier may include a filename of the file, including a path (e.g., directory), a base name, and an extension, among others. In some embodiments, the one or more files may be selected by the user of the client 205 via a graphical user interface displaying a list of files available for access. The request to store data and the request to access data may include other information to carry out the function indicated by the request.

Both types of requests may include an account identifier corresponding to the user. The account identifier may be a set of alphanumeric characters (e.g., a user name, a screen name, and an email address). In some embodiments, the account identifier may be particular to enterprise storage service provider associated with the storage service 210, and may differ from the account identifiers used to logon onto the third-party storage service providers. In some embodiments, the request may include a passcode in addition to the account identifier to login with the enterprise storage service provider. In some embodiments, both types of requests may include a location identifier. The location identifier may be a physical address, geographic coordinates, or a network address (e.g., an Internet Protocol (IP) address or a media access control (MAC) address), among others. In some embodiments, both types of requests may include one or more user preferences (also referred to as settings). The one or more user preferences may include at least one physical location of storage, at least one preferred storage service provider 215, and at least one device configuration of the client 205, among others. The physical location of storage may be a geographic region selected as preferred by the user of the client 205 to store the data of the user. The preferred storage service provider may include one or more enterprise or third-party storage service providers (e.g., storage service providers 215) selected as preferred by the user of the client 205 to store and maintain the data of the user. The device configuration may include a device type (e.g., a mobile device, a laptop, a desktop, and a server) installed software (e.g., operating system, agents, and applications) and device capabilities (e.g., hard drive space, memory, and display resolution) of the client 205, among others.

Upon receipt of the request to store data or to access data, the policy manager 230 may identify a profile for the user of the client 205. The profile of the user may include at least one location of the user, a storage size assigned to or requested by the user, and one or more preferences of the user. The location of the user may correspond to a geographic location or a region that the user resides. The storage size assigned to or requested by the user may specify an amount of storage space is permitted to be allocated for maintaining the data of the user. The one or more preferences of the user may include the at least one physical location of storage, the at least one preferred storage service provider 215, and the at least one device configuration of the client 205. In some embodiments, the profile of the user may be set by the user in setting up an account with the enterprise storage service provider associated with the storage service 210. In some embodiments, the profile of the user may be set by the user in setting up accounts with any one of the third-party storage service providers associated with one or more storage service providers 215. In some embodiments, the policy manager 230 may maintain the profile of the user on a database on the storage service 210 or otherwise accessible by the storage service 210.

To identify the profile of the user, the policy manager 230 may parse the request (of either type) from the client 205 to retrieve or identify the contents of the request. From parsing the request, the policy manager 230 may identify the account identifier of the user associated with the client 205 that sent the request. Using the account identifier of the user, the policy manager 230 may identify the profile for user maintained on the database accessible by the storage service 210. In some embodiments, the policy manager 230 may set the contents of the request at least a portion of the profile for the user. By parsing the request, the policy manager 230 may also identify the location identifier of the client 205 of the user. The policy manager may set the location identifier of the client 205 from the request as the location of the user in the profile for the user. In some embodiments, the policy manager 230 may map the network address to a geographic region or location in setting the location of the user in the user profile. The policy manager 230 may also identify the one or more user preferences included in the request. The policy manager 230 may set the one or more user preferences included in the request as the one or more user preferences in the profile for the user.

The policy manager 230 may also determine whether the request is to store data or to access data. In some embodiments, the policy manager 230 may parse the request to retrieve or identify the indicator specifying whether the request is to store data or to access data. Based on the indicator, the policy manager 230 may determine whether the request is to store data or to access data. When the request is determined to correspond to a request to access data, the policy manager 230 may determine the storage size assigned to the user from the user profile. On the other hand, when the request is determined to correspond to a request to store data, the policy manager 230 may calculate, determine, or identify the storage size requested by the user based on the request. In some embodiments, the policy manager 230 may identify the one or more files identified by the request to store data. The policy manager 230 may measure or determine a file size for each of the files identified by the request to store data. Based on the file size determined for each of the files identified in the request to store data, the policy manager 230 may determine a total file size as the storage size requested by the user in storing the data.

In some embodiments, the policy manager 230 may identify the storage size assigned to the user and a remaining storage size from the total storage size assigned to the user. The assigned storage size may have been pre-set when the user set up the account with the enterprise storage service provider associated with the storage service 210. The policy manager 230 may compare the total file size of the files identified in the request with the remaining storage size assigned to the user. If the total file size is determined to be less than or equal to the remaining storage size, the policy manager 230 may continue processing the request to carry out the storing of the data. Conversely, if the total file size is determined to be greater than the remaining storage size, the policy manager 230 may halt processing of the request and may send a failure notification to the client 205 that sent the request. The notification may indicate to the user of the client 205 that the total size of the data requested to be stored is too large.

With the identification of the profile of the user, the policy manager 230 may identify a policy for the user of the client 205. The policy may specify usage of one or more of the storage service providers 215 based on the profile for the user. As described above, the storage service providers 215 may include at least one third-party storage service provider or at least one enterprise storage service provider. In some embodiments, the policy may specify a location of each storage service provider 215, a storage size available at each storage service provider 215, and device configurations compatible with each storage service provider 215. The location may indicate a physical, geographic region or location of the storage service provider 215. In some embodiments, the policy manager 230 may keep track of the available storage space at each storage service provider 215. In some embodiments, the policy manager 230 may select the policy from a set of multiple policies for the user to carry out the request. Each policy may differ from the other in specifying which of the one or more storage service providers 215 are to be used for the user.

To identify the policy in storing the data of the user, the policy manager 230 may compare the profile for user with one or more of the policies. In comparing, the policy manager 230 may compare the location of the user in the profile with the location of each storage service provider 215 as specified in the policy. The policy manager 230 may compare the location of each storage service provider 215 specified in the policy with the one or more physical locations for storage of data as indicated in the user preference. The policy manager 230 may also compare the available storage space in each storage service provider 215 with the storage size requested by the user. In some embodiments, the policy manager 230 may determine which storage service provider 215 has more storage space available than the storage size requested by the user. The policy manager 230 may also identify which storage service providers 215 are preferred by the user in accordance with the preferences indicated in the user profile. In addition, the policy manager 230 may compare the compatible device configurations of the storage service provider 215 with the device configurations indicated in the user profile. Based on the comparison, the policy manager 230 may select the policy for the user. In some embodiments, the policy manager 230 may determine a number of matches between the specifications of policy and the user profile. Each match may correspond to when the user profile satisfy the specifications of the policy. The policy manager 230 may identify the policy with the highest number of matches in the specifications with the user profile.

When the request is determined to be a request to store data, the policy manager 230 may determine or select one or more of the storage service providers 215 to use to store the data of the user based on the policy for the user. The one or more storage service providers 215 selected based on the policy for the user may include at least one third-party storage service provider or at least one enterprise storage service provider. In determining the one or more storage service providers 215 to use in storing the data, the policy manager 230 may compare the user profile with the specifications of the policy. The policy may initially list or allow for multiple storage service providers 215 as potential candidates for storing the data of the user. The policy manager 230 may select a subset of the storage service providers 215 in accordance to the identified policy and the profile for the user, among other factors.

For each storage service provider 215 listed in the policy, the policy manager 230 may determine whether the location of the user indicated in the profile is within a threshold distance of the location of the storage service provider 215 as specified in the policy. The threshold distance may correspond to a physical or geographic distance from the location of a physical infrastructure for the storage service provider 215. In some embodiments, the policy manager 230 may determine whether the client 205 of the user is within the threshold distance of the location of the storage service provider 215. In some embodiments, prior to the comparison, the policy manager 230 may convert the network address for the client 205 to a geographic location using the network 225. If the location of the user or the client 205 associated with the user is determined to be outside the threshold distance from the location of the storage service provider 215, the policy manager 230 may exclude the storage service provider 215 from selection. The excluded storage service provider 215 may be one of the third-party storage service providers. If the location of the user or the client 205 associated with the user is determined to be outside threshold distance from the location of all the storage service providers 215, the policy manager 230 may select the enterprise storage service provider (e.g., the storage service 210 itself) for storage of the data. On the other hand, if the location of the user or the client 205 associated with the user is determined to be within the threshold distance from the location of the at least one of the storage service providers 215, the policy manager 230 may include the storage service provider 215 for selection to store the data. The storage service provider 215 may include the third-party storage service provider.

In selecting the storage service provider 215, the policy manager 230 may also compare the available storage space at the storage service provider 215 to the requested storage size for the data of the user. As described above, the policy manager 230 may determine the requested storage size for the data of the user by determine a file size of the one or more files identified in the request from the client 205 of the user. In addition, the policy manager 230 may keep track of the available storage space at each storage service provider 215. In some embodiments, the policy manager 230 may identify the available storage space at each storage vector 220 at each respective storage service provider 215. Based on the available storage space at each storage vector 220, the policy manager 230 may identify or determine the total available storage space for the respective storage service provider 215. For each storage service provider 215, the policy manager 230 may compare the available storage space at the storage service provider 215 with the requested storage size of the data of the user. If the available storage space at the storage service provider 215 is determined to be less than the requested storage size, the policy manager 230 may exclude the storage service provider 215 from selection. The excluded storage service provider 215 may be one of the third-party storage service providers. If all the available storage space at the storage service provider 215 is determined to be less than the requested storage size, the policy manager 230 may select the enterprise storage service provider (e.g., the storage service 210 itself) for storage of the data. On the other hand, if the available storage space at the storage service provider 215 is determined to be greater than or equal to the requested storage size, the policy manager 230 may include the storage service provider 215 for selection to store the data. The storage service provider 215 may include the third-party storage service provider.

Furthermore, the policy manager 230 may determine whether the device configurations of the client 205 of the user are compatible with one or more of the storage service providers 215. As described above, the device configurations of the client 205 may include a device type (e.g., a mobile device, a laptop, a desktop, and a server) installed software (e.g., operating system, agents, and applications) and device capabilities (e.g., hard drive space, memory, and display resolution), among others. The policy may specify that the storage service provider 215 may be compatible with certain client configurations but may be incompatible with other device configurations. For each storage service provider 215, the policy manager 230 may determine whether the device configurations of the client 205 are compatible with the device configurations specified by the policy for the storage service provider 215. If the device configurations of the client 205 are determined to be incompatible with the device configurations of the storage service provider 215, the policy manager 230 may exclude the storage service provider 215 from selection. The excluded storage service provider 215 may be one of the third-party storage service providers. If none of the storage service providers 215 are determined to be compatible with the device configurations of the client 205, the policy manager 230 may select the enterprise storage service provider (e.g., the storage service 210 itself) for storage of the data. On the other hand, if the device configurations of the client 205 are determined to be compatible with the device configurations of the client 205, the policy manager 230 may include the storage service provider 215 for selection to store the data. The storage service provider 215 may include the third-party storage service provider.

With the selection of one or more of the storage service providers 215, the access controller 235 may manage access to the selected storage service providers 215. In some embodiments, the access controller 235 may identify each of the storage service provider 215 selected based on the policy for the user of the client 205. The access controller 235 may identify or determine whether the storage service provider 215 corresponds to the third-party storage service or the enterprise storage service. For each storage service provider 215 identified as corresponding to the enterprise storage service provider, the access controller 235 may authenticate access to the enterprise storage service provider using the request. As discussed above, the request to store data and the request to access data both may include the account identifier and the passcode to login to the enterprise storage service, among others. In some embodiments, the access controller 235 may authenticate the user with the enterprise storage service using the account identifier and the passcode parsed from the request. To authenticate the user, the access controller 235 may compare the passcode from the request with the passcode stored for the account identifier included in the request from the client 205. If the passcodes match, the access controller 235 may determine that the authentication of the user is successful and may permit access to storage of the data included in the request onto the enterprise storage service provider. In some embodiments, the access controller 235 may authenticate the user without the request (and without the account identifier or the passcode), responsive to determining that the selected storage service provider corresponds to the enterprise storage service provider.

On the other hand, for each storage service provider 215 identified as corresponding to the third-party storage service provider, the access controller 235 may authenticate access to the third-party storage provider. In some embodiments, the access controller 235 may retrieve or obtain authentication credentials for accessing the one or more storage vectors 220 of the storage service provider 215. The authentication credentials may include an account identifier and passcode, among other data, for accessing data via the third-party storage service provider. The account identifier and the passcode for the third-party storage service provider may differ from the account identifier and the passcode for the enterprise storage service provider. In some embodiments, the access controller 235 may maintain the authentication credentials for accessing the third-party storage service provider on a database accessible from the storage service 210. The authentication credentials for the third-party storage service may have been received from the user when setting up the account with the enterprise storage service. The authentication credentials for the third-party storage service may be indexed or identified on the storage service 210 using the account identifier for the enterprise storage service associated with the storage service 210. Using the account identifier of the user for authenticating with the enterprise storage service, the access controller 235 may find or identify the authentication credentials of the user for authenticating with the third-party storage service.

Using the authentication credentials for the third-party service provider, the access controller 235 may authenticate the user of the client 205 that sent the request. The access controller 235 may send or provide the authentication credential to the corresponding storage service provider 215 via the network 225. In response to receiving the authentication credentials, the storage service provider 215 may parse to the authentication credentials to identify the account identifier and the passcode. The storage service provider 215 may store and maintain account credentials for accounts with the third-party storage service provider corresponding to the storage service provider 215. The storage service provider 215 may then identify the passcode for the user using the account identifier received from the access controller 235. To authenticate the user, the storage service provider 215 may compare the passcode received from the access controller 235 with the passcode stored on the storage service provider 215 for the account identifier. If the passcodes do not match, the storage service provider 215 may determine that the authentication is unsuccessful and may send a failure notification to the access controller 235. The access controller 235 in turn may forward the failure notification to the client 205 of the user and may provide a prompt to re-enter authentication credentials for the third-party storage service provider. Conversely, if the passcodes match, the storage service provider 215 may determine that the authentication is successful, and may send a success notification to the access controller 235 to permit access to the storage service provider 215. In some embodiments, the success notification may include the addresses, the locations, or the storage size of the one or more storage vectors 220 of the storage service provider 215.

In some embodiments, the access controller 235 may retrieve or identify the address of each storage vector 220 in the storage service providers 215. The retrieval or identification of the addresses of the storage vectors 220 may be independent of the authentication. The storage service providers 215 may include at least one third-party storage service provider or at least one enterprise storage service provider. For each storage service provider 215 selected based on the policy, the access controller 235 may identify the location, address, and the storage size of each storage vector 220 of the storage service provider 215. In some embodiments, the access controller 235 may maintain and store the location, address, and the storage size of the storage vectors 220 of the storage service providers 215. In some embodiments, the access controller 235 may send a request for addresses to each storage service provider 215 selected based on the policy for the user. In response to receipt to the request, the storage service provider 215 may identify the location, the address, or the storage size of each storage vector 220. In some embodiments, the storage service provider 215 may determine or identify an available storage space on each storage vector 220, in response to receipt of the request. The storage service provider 215 may provide a response with the addresses, the locations, or the storage size of each storage vector 220 maintained by the storage service provider 215 to the access controller 235. Upon receipt of the response from the storage service provider 215, the access controller 235 may parse the receipt to identify the location, the address, and the storage size of each storage vector 220 of the storage service provider 215.

Based on the identification of the storage vectors 220 of the selected storage service providers 215, the storage manager 240 may select a subset of the storage vectors 220 based on the policy or the profile for the users to store the data of the user. In some embodiments, the selection of the storage vector 220 may be responsive to successful authentication of the user with the enterprise or third-party storage service provider. The selection of the storage vectors 220 may be, for example, based on the location of the client 205 of the user relative to the locations of the storage vectors 220. As discussed above, for the same storage service provider 215, one set of storage vectors 220 may be situated in a geographic region or location different from another set of storage vectors 220. To select the storage vectors 220 at each selected storage service provider 215, the storage manager 240 may determine whether the location of the user indicated in the profile is within a threshold distance of the location of the storage vector 220. The threshold distance may correspond to a physical or geographic distance from the location of the storage vector 220. In some embodiments, the storage manager 240 may determine whether the client 205 of the user is within the threshold distance of the location of storage vector 220. In some embodiments, prior to the comparison, the storage manager 240 may convert the network address for the client 205 to a geographic location using the network 225. If the location of the user or the client 205 associated with the user is determined to be outside the threshold distance from the location of the storage vector 220, the storage manager 240 may exclude storage vector 220 from selection. The excluded storage vector 220 may be one of the third-party storage service providers. If the location of the user or the client 205 associated with the user is determined to be outside threshold distance from the location of all storage vectors 220, the storage manager 240 may select the enterprise storage service provider (e.g., the storage 250) for storage of the data. On the other hand, if the location of the user or the client 205 associated with the user is determined to be within the threshold distance from the location of the at least one of the storage vectors 220, the storage manager 240 may include the storage vector 220 for selection to store the data.

In selecting the storage vector 220, the storage manager 240 may also compare the available storage space at the storage vector 220 to the requested storage size for the data of the user. In some embodiments, the storage manager 240 may determine the requested storage size for the data of the user by determine a file size of the one or more files identified in the request from the client 205 of the user. Additionally, the storage manager 240 may identify the available storage space at each storage vector 220 kept track by the storage service provider 215. In some embodiments, the storage manager 240 may identify the available storage space at each storage vector 220 at each respective storage vector 220. Based on the available storage space at each storage vector 220, the storage manager 240 may identify or determine the total available storage space for the respective storage vector 220. For each storage vector 220, the storage manager 240 may compare the available storage space at the storage vector 220 with the requested storage size of the data of the user. If the available storage space at the storage vector 220 is determined to be less than the requested storage size, the storage manager 240 may exclude the storage vector 220 from selection. If all the available storage space at the storage vector 220 is determined to be less than the requested storage size, the storage manager 240 may select the enterprise storage service provider (e.g., the storage service 210 itself) for storage of the data. On the other hand, if the available storage space at the storage vector 220 is determined to be greater than or equal to the requested storage size, the storage manager 240 may include the storage vector 220 for selection to store the data.

In some embodiments, the storage manager 240 may parse the request to store data received from the client 205 of the user to retrieve or identify the data to be stored onto the storage vectors 220. In some embodiments, the storage manager 240 may parse the request to identify the one or more files corresponding to the data to be stored onto the storage vectors 220. In some embodiments, the storage manager 240 may retrieve or identify the one or more files identified by the request to store data using the file identifier included in the request. In some embodiments, the storage manager 240 may combine or aggregate the one or more files identified using the request into a single block of data.

In preparation of storing the data, the storage manager 240 may generate multiple portions of the data for storage across the storage vectors 220 of the selected storage service providers 215. Each portion of data may include or correspond to a subset of bits, bytes (e.g., multiple bits), or blocks (e.g., multiple bytes) from the bitstream corresponding to the entirety of the data. In some embodiments, at least one portion data may include striped data. In some embodiments, at least one portion of data may include mirrored data. In some embodiments, the storage manager 240 may generate the multiple portions of the data for storage in association or in accordance with a Redundant Array of Independent Disks (RAID) level. The RAID level may specify striping of the portions of the data, mirroring of the portions of the data, and insertion of parity in the portions of the data. For example, RAID level 0 may specify data striping. RAID level 1 may specify mirroring of data. RAID level 2 may specify bit-level striping of data with Hamming code parity. RAID level 3 may specify byte level striping with parity. RAID level 4 may specify block-level striping with parity. RAID level 5 may specify block-level striping with distributed parity. RAID level 6 may specify block-level striping with doubly distributed parity.

In some embodiments, the storage manager 240 may partition or divide the data into the multiple portions. In some embodiments, the storage manager 240 may divide the data by stripping the data into the multiple portions. The striped data may include or correspond to consecutive subsets of bits, bytes, words, or blocks from the entirety of the data. In some embodiments, the storage manager 240 may divide the data using a moving window over the entire span of the data. The moving window may correspond to overlapping segments of the data. The portions of the data identified using the moving window may be partially common with other portions of the data. To divide the data into multiple portions, the storage manager 240 may identify each segment of the data from the entirety of the data. With each identified segment, the storage manager 240 may replicate the segment to generate the portion of data to store onto the storage vectors 220. In some embodiments, the storage manager 240 may generate multiple replications of the same portions of the data. For each portion of the data, the storage manager 240 may generate mirrored data by replicating the portion one or more times. In some embodiments, for each portion of data, the storage manager 240 may determine or generate a parity portion to include into storage with the data based on the portion of the data. The parity portion may include bits, bytes (e.g., multiple bits), or blocks (e.g., multiple bytes). In some embodiments, the storage manager 240 may generate the parity portion in accordance to any number of parity functions, such as Hamming codes, Polynomial codes, and Reed-Solomon codes, among others.

The storage manager 240 may write, save, or otherwise store the portions of the data onto storage vectors 220 across the selected storage service providers 215. As discussed above, the selected storage service providers 215 may include at least one third-party storage service provider or at least one enterprise storage service provider. The storage vectors 220 may be across one or more of the selected storage service providers 215. In some embodiments, the storage manager 240 may store the portions of the data onto the selected subset of storage vectors 220 across the selected storage providers 215. For example, the storage manager 240 may store a first portion of the data onto the storage vector 220A-3 of the first storage service provider 215A corresponding to one of the selected third-party storage service providers. The storage manager 240 may also store a second portion of the data onto the storage vector 220B-20 of the second storage service provider 215B corresponding to another selected third-party storage service provider or the enterprise storage service provider. In this manner, the data from the client 205 of the user may be stored over multiple third-party and enterprise storage service providers. In some embodiments, the storage manager 240 may store at least the portion of the data onto the storage 250 of the storage service 210, when the storage service 210 is selected based on the policy and profile for the user. In some embodiments, the storage manager 240 may add the account identifier for the user into each portion of the data when storing the data onto the storage vectors 220 across the selected storage service providers 215.

In some embodiments, the storage manager 240 may store the portions of the data onto the storage vector 220 of the storage service provider 215 in accordance with the RAID level. The storage manager 240 may traverse through the generated portions of the data to store onto the storage vectors 220 of the storage service providers 215. For each portion, the storage manager 240 may identify the portion of the data as the mirrored portion, the striped portion, or the parity portion. If the portion is identified as mirrored, the storage manager 240 may store the mirrored portion of data on each of the storage vectors 220 across the selected storage service providers 215 or the storage 250 in accordance with the specified RAID level. If the portion is identified as striped, the storage manager 240 may store the striped portions of data on consecutive storage vectors 220 across the selected storage service providers 215 or the storage 250 in accordance with the specified RAID level. If the portion is identified as parity, the storage manager 240 may insert the portion prior or subsequent to the portion from which the parity portion was generated on the storage vector 220 or the storage 250 in accordance with the specified RAID level.

In some embodiments, the storage manager 240 may identify the address of each storage vector 220 from each selected storage service provider 215. The storage vector 220 may be of the selected subset of storage vectors 220 from the selected storage service providers 215. Using the addresses, the storage manager 240 may identify the storage vectors 220 across the one or more selected storage service providers 215 to store the data of the user. With the identification, the storage manager 240 may send the portion of data to the storage vector 220 for storage. In some embodiments, the storage manager 240 may generate a request to store the portion of the data to send to the storage vector 220 via the network 225. The request to store data may include the address of the storage vector 220 and the portion of the data to be stored on the storage vector 220. Upon receipt of the data, the storage vector 220 may store the portion of the data. In some embodiments, the storage vector 220 may parse the request to identify the portion of data for storage.

In storing the portions of the data, the storage manager 240 may generate an encrypted form for each portion data to store onto the storage vector 220. In some embodiments, the storage manager 240 may use a cryptographic algorithm to generate the encrypted form of the portion of data. The cryptographic algorithm may include asymmetric cryptographic algorithms (e.g., a block cipher, stream cipher, and cryptographic hash function) and asymmetric cryptographic algorithms (e.g., RSA algorithm, Diffie-Hellman key exchange protocol, and digital signature), among others. In some embodiments, the storage manager 240 may apply the same cryptographic algorithms across the portions of the data generated from the data of the user. In some embodiments, the storage manager 240 may apply different cryptographic algorithms on at least two portions of the data to store across the storage vectors 220 of the storage service providers 215. For example, the storage manager 240 may apply a SHA-1 cryptographic hash function on the portion of the data to be stored on the storage vector 220A-5 of the first storage service provider 215A. The storage manager 240 may apply an RSA algorithm on the portion of the data to be stored on the storage vector 220B-30 on the second storage service provider 215B. Having applied the cryptographic algorithm, the storage manager 240 may store the encrypted form of the portion of data onto the storage vectors 220 across the selected storage service providers 215 or the storage 250 of the storage service 210.

With the data of the user stored onto the storage vectors 220 across the selected storage providers 215, the storage manager 240 may record the selected storage vectors 220 and the selected storage service providers 215 on which the data of the user is stored in a route table. The route table may be maintained on the storage service 210. In some embodiments, the storage manager 240 may record the locations or the addresses of the selected storage vectors 220 and the selected storage service provider 215 on the route table. The locations or the addresses may be indexed, associated with, or otherwise identified with the account identifier of the user of the client 205 that sent the request to store the data on the route table. In some embodiments, the storage manager 240 may record the RAID level used to store the portions of the data of the user across the storage vectors 220 of the selected storage providers 215 on the route table. In some embodiments, the storage manager 240 may record a type of the portion of the data stored on each storage vector 220 onto the route table. The type may include mirror, striped, and parity in accordance with RAID. In some embodiments, the storage manager 240 may record a sequence of writing of the portions of data onto the storage vector 220. In some embodiments, the storage manager 240 may record the type of cryptographic algorithm applied in storing the portions of data across the storage vectors 220 of the storage service provider 215 onto the route table. In some embodiments, the storage manager 240 may also update the available storage space at each storage vector 220 and each storage service provider 215, responsive to storage of the data on the route table. In some embodiments, the storage manager 240 may also update the available storage space of the storage 250 on the route table.

When the request is determined to be a request to access data, the policy manager 230 may identify the selected storage vectors 220 and the selected storage providers 215 on which the data of the user is stored. The storage vectors 220 and the storage providers 215 may have been previously selected based on the policy or the profile for the user as described above. In some embodiments, the policy manager 230 may identify the storage 250 on which the data of the user is stored. As discussed above, the request to access data received from the client 205 may also include the account identifier corresponding to the user, among other information. In some embodiments, the policy manager 230 may parse the request to access data to identify the account identifier. Using the account identifier, the policy manager 230 may identify each storage vector 220 and each storage service provider 215 on which the data of the user is stored. The storage service provider 215 may include at least one enterprise storage service provider or at least one third-party storage service provider. In some embodiments, the policy manager 230 may identify each storage vector 220 and each storage service provider 215 as recorded using the account identified from the request to access data on the route table. The policy manager 230 may also identify the storage 250 of the storage service 210 on which the data of the user is stored. In some embodiments, the policy manager 230 may identify the locations and addresses of the storage vectors 220 and the storage service providers 215 on which the data of the user is stored.

The access controller 235 may authenticate the user of the client 205 that sent the request to access data in a similar manner as with the user of the client 205 that sent the request to store data. The authentication of the user may be with the enterprise storage service provider or the third-party storage service provider. As discussed above in summary, the access controller 235 may authenticate the user with the enterprise storage service using the account identifier and the passcode parsed from the request. To authenticate with the third-party storage service provider, the access controller 235 may retrieve or obtain authentication credentials for accessing the one or more storage vectors 220 of the storage service provider 215 using the account identifier of the user for authenticating with the enterprise storage service provider. With the authentication credentials for the third-party storage service provider, the access controller 235 may authenticate the user.

The storage manager 240 may retrieve or obtain different portions of the data across the storage vectors 220 of the selected storage service providers 215. In some embodiments, the storage manager 240 may identify the storage vectors 220 and the storage service providers 215 using the identified addresses. In some embodiments, the storage manager 240 may also identify the storage 250 on the storage service 210. With the identification, the storage manager 240 may access the storage vectors 220 of the storage service providers 215 to retrieve or obtain the portion of the data for the user stored thereon. The storage manager 240 may also access the storage 250 to retrieve or obtain the portion of the data for the user. In some embodiments, the storage manager 240 may aggregate the portions of the data retrieved from the storage vectors 220 and the storage 250.

In some embodiments, the storage manager 240 may determine a decrypted form for each portion data to retrieve from the storage vector 220 or the storage 250. In some embodiments, the storage manager 240 may use a cryptographic algorithm to generate the decrypted form of the portion of data. The cryptographic algorithm may include asymmetric cryptographic algorithms (e.g., a block cipher, stream cipher, and cryptographic hash function) and asymmetric cryptographic algorithms (e.g., RSA algorithm, Diffie-Hellman key exchange protocol, and digital signature), among others. In some embodiments, the storage manager 240 may determine or identify which cryptographic algorithm to apply in decrypting by accessing the route table of the type of cryptographic was applied in encrypting the portion of data. The storage manager 240 may then apply the identified cryptographic algorithm to the encrypted form the portion of the data to recover or generate the decrypted form of the portion of the data. The storage manager 240 may repeat the decryption over all the portions of the data stored in the storage vector 220 or the storage 250.

The storage manager 240 may combine portions of the data retrieved from the storage vectors 220 across the storage service providers 215 or the storage 250. As described above, each portion may include or correspond to a subset of bits, bytes (e.g., multiple bits), or blocks (e.g., multiple bytes) from the bitstream corresponding to the entirety of the data. With the portions of the data retrieved from the storage vectors 220 or the storage 250, the storage manager 240 may reconstruct or generate the entirety of the data. In some embodiments, the storage manager 240 may combine the portions of the data in accordance to the RAID level with which the portions of data were stored. The storage manager 240 may traverse through the portions of the data retrieved from the storage vectors 220 of the storage service providers 215 or the storage 250. For each portion, the storage manager 240 may identify the portion of the data as the mirrored portion, the striped portion, or the parity portion. If the portion is identified as mirrored, the storage manager 240 may retain the mirrored portions of the data and ignore the remaining portions identical to the selected mirror portion. The storage manager 240 may also concatenate, attach, or otherwise add the selected mirror portion to the other portions of the reconstructed data in accordance with the RAID level. The storage manager 240 may identify the RAID level used to store the data from the route table. If the portion is identified as striped, the storage manager 240 may retain the striped portion of the data. The storage manager 240 may also concatenate, attach, or otherwise add the striped portion to the other portions of the reconstructed data in accordance with the RAID level. If the portion is identified as parity, the storage manager 240 may check the parity portion against the prior or subsequent portion of data used to generate the parity portion. Based on the check, the storage manager 240 may perform error correction on the portion of the data, including the corresponding portion of the reconstructed data. In this manner, the storage manager 240 may recover data stored across multiple storage vectors 220 and storage providers 215.

In maintaining the data across the storage vectors 220 and the storage 250, the exception handler 245 may monitor for outages among the storage service providers 215. An outage may correspond to any event leading to inaccessibility of the storage service provider 215 or the data stored on the storage service provider 215 via the network 225. In some embodiments, the exception handler 245 may monitor for outages among each storage vector 220 of each storage service provider 215. To monitor for outages at each storage service provider 215, the exception handler 245 may wait for receipt of a heartbeat packet from the storage service 215. In some embodiments, the exception handler 245 may wait for receipt of the heartbeat packet from each individual storage vector 220 of the storage service provider 215. Each storage service provider 215 may send the heartbeat packet at a time interval via the network 225. In some embodiments, the storage vectors 220 of each storage service provider 215 may also send the heartbeat packet at the time interval via the network 225. The exception handler 245 may maintain a timer to keep track of a time elapsed since receipt of the previous heartbeat packet for each storage service provider 215 or each storage vector 220. The exception handler 245 may compare the elapsed time to the time interval between each heartbeat packet. If the elapsed time for the storage service provider 215 is determined to be greater than the time interval, the exception handler 245 may determine an outage at the corresponding storage service provider 215. In some embodiments, if the elapsed time for the storage vector 220 is determined to be greater than the time interval, the exception handler 245 may determine an outage at the corresponding storage vector 220.

In some embodiments, the exception handler 245 may receive a termination notification from the storage service provider 215. The exception handler 245 may also receive the termination notification from the individual storage vector 220. The termination notification may indicate to the exception handler 245 that the storage service provider 215 or the storage vector 220 will not store or maintain the data of users making requests to the storage service 210. In some embodiments, the termination notification may include the location and the address of the storage service provider 215 or the storage vector 220. Upon receipt of the termination notification from the storage service provider 215, the exception handler 245 may determine an outage at the storage service provider 215. In some embodiments, responsive to receipt of the termination notification from the storage vector 220, the exception handler 245 may determine an outage at the storage vector 220.

Responsive to detection of an outage among the storage service providers 215 or the individual storage vectors 220, the exception handler 245 may recover the data stored on the affected storage service providers 215 or the storage vectors 220. The exception handler 245 may identify the storage service providers 215 with the outage. In some embodiments, the exception handler 245 may identify the storage vectors 220 with the outage. In some embodiments, the exception handler 245 may identify the one or more users (or account identifiers) whose data were stored on the storage vectors 220 with the outage. In some embodiments, the exception handler 245 may identify the profiles of the users. Based on the profiles of the users, the exception handler 245 may identify the policies of the user in the manner described above. Using the policy for each user, the exception handler 245 may identify a substitute storage service provider 215 to replace the storage service provider 215 with the outage. In some embodiments, the exception handler 245 may identify one or more substitute storage vectors 220 to replace the storage vectors 220 with the outage. The identification of the substitute storage service providers 215 and the storage vectors 220 may be done as in response to receipt of the request to store data detailed above with respect to the policy manager 230.

The exception handler 245 may identify the one or more portions of the data stored on the storage vectors 220 of the storage service provider 215 with the outage. In some embodiments, the identification of the portion of the data may be based on the route table. In some embodiments, the exception handler 245 may identify the one or more portions of the data stored on storage vectors 220 without the outage. The portions of the data may have been for the same user, and stored across the storage vector 220 with the outage and the storage vector 220 without the outage. Based on the portion of the data identified across the storage vectors 220 without the outage and the route table, the exception handler 245 may replicate the portions of the data stored on the storage vector 220 with the outage. In some embodiments, the replication of the portions of the data by the exception handler 245 may be in accordance with the type of the portion of the data (e.g., mirrored, striped, or parity) the RAID level for the data of the user as recorded on the route table. In some embodiments, the replication of the portions of the data may be based on the sequence of the writing of the portions of the data onto the storage vectors 220 as recorded on the route table. For each user whose data is stored on the storage vector 220 with the outage, the exception handler 245 may identify the portions of data stored on the storage vectors 220 without the outage in accordance to the sequence of writing. The identified portions of data may be prior or subsequent to the storage vector 220 with the outage in the sequence recorded on the route table. For each identified portion of the data, the exception handler 245 may identify the type of the portion of the data as one of the mirrored, striped, and parity. Based on the identification of the types of the portions of the data and the RAID level, the exception handler 245 may recover the portions of the data stored on the storage vector 220 with the outage. The exception handler 245 may store the recovered portions of the data onto the one or more substitute storage service providers 215 or the storage vectors 220. In some embodiments, the exception handler 245 may update the route table for the data of the user with the substitute service providers 215 or the storage vectors 220 storing the recovered portions of data.

Figures 3, 4:
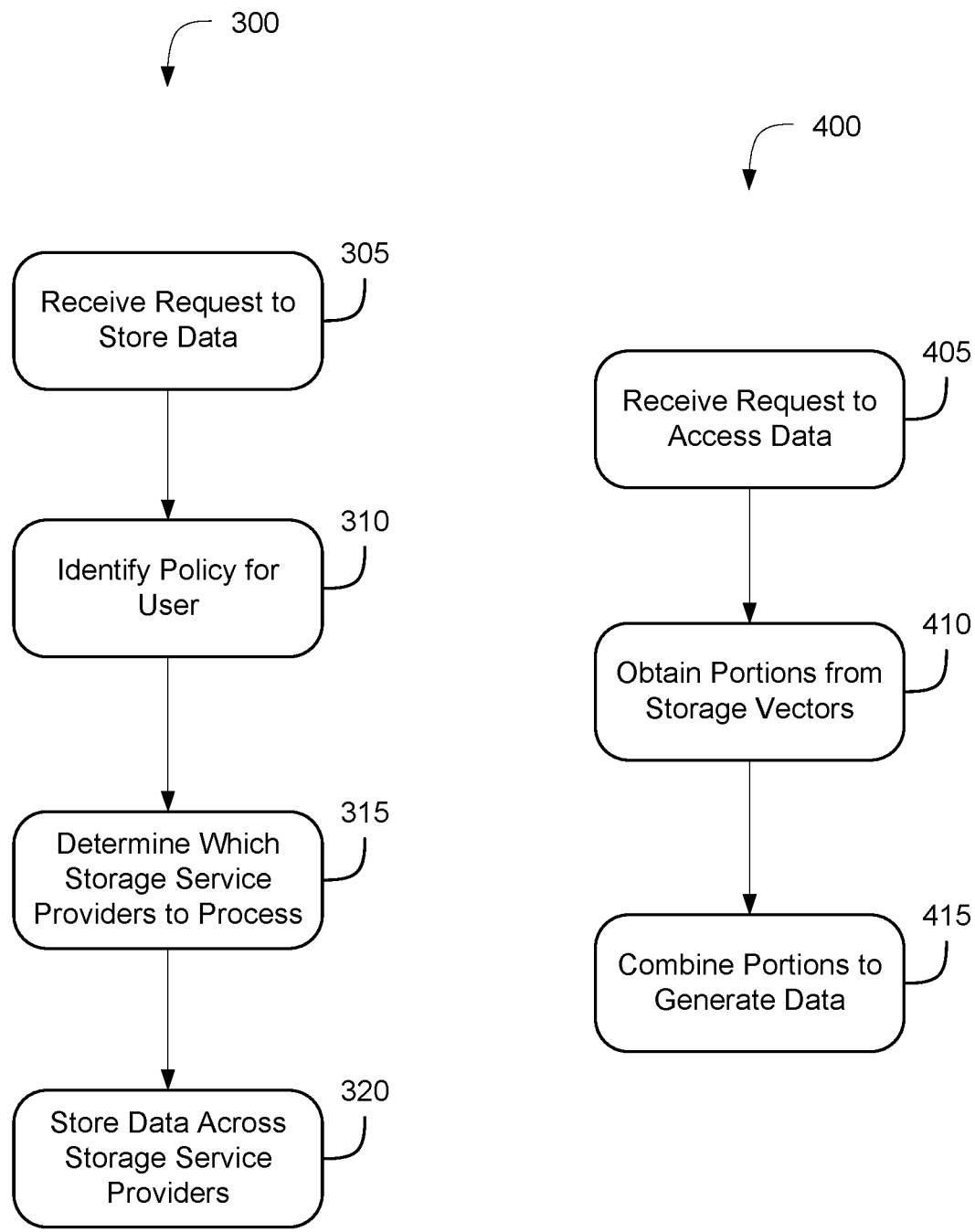
FIG. 3 is a flow diagram of an example embodiment of a method of managing storage of data of a user across a plurality of third-party public storage service providers.
FIG. 4 is a flow diagram of an example embodiment of a method of managing storage of data of a user across a plurality of third-party public storage service providers.

Referring now to FIG. 3, depicted is a flow diagram of an example embodiment for a method 300 of managing storage of data of a user across a plurality of third-party public storage service providers. The functionalities of method 300 may be implemented using, or performed by, the component described herein in conjunction with FIGS. 1 and 2, such as the client 205, the storage service 210, and storage service provider 215. In overview, a storage service (e.g., the storage service 210) may receive a request to store data (305). The storage service may identify a policy for the user (310). The storage service may determine which storage service provider to process the request (315). The storage service may store data across vectors of the storage service provider (320).

In further detail, the storage service (e.g., the storage service 210) may receive a request to store data (305). The storage service may be in communication with one or more third-party storage service provider. Each third-party storage service provider may include one or more storage vectors for storing and maintaining data. The request to store data received from a client may include the data store via the storage service. The data may be in the form of files. The request may also include an account identifier corresponding to a user of the client.

The storage service may identify a policy for the user (310). The storage service may identify the policy for the user based on a profile for the user. Using the request, the storage service may identify the profile for the user. The profile for the user may include a location of the user, a storage size assigned to the user, and user preferences. The user preferences may include a preference for location of storage, preferred storage service providers, and device configurations of the client. The policy may specify selection of the storage service providers and the storage vectors based on the user profile.

The storage service may determine which storage service provider to process the request (315). Based on the policy, the storage service may select one or more storage service provider to store the data of the user. If the location of the user is determined to be outside a threshold distance of the storage service provider, the storage service may exclude the storage service provider from selection for storage of the data of the user. On the other hand, if the location of the user is determined to be within the threshold distance of the storage service provider, the storage service may select the storage service provider for storage of the data of the user. The storage service may use other factors in selecting the storage service providers, such as available storage space and compatibility with the device configurations of the client.

The storage service may store data across the storage service provider (320). In storing the data, the storage service may generate multiple portions of the data for storage across the storage vectors of the storage service providers. Each portion of data may include or correspond to a subset of bits, bytes (e.g., multiple bits), or blocks (e.g., multiple bytes) from the bitstream corresponding to the entirety of the data. The storage service may store the multiple portions of the data across the storage vectors in accordance to a Redundant Array of Independent Disks (RAID) level. The portion of the data may be mirrored, striped, or parity. The storage service may record information regarding storage of the data for the user onto a route table.

Referring now to FIG. 4, depicted is a flow diagram of an example embodiment for a method 400 of managing storage of data of a user across a plurality of third-party public storage service providers. The functionalities of method 400 may be implemented using, or performed by, the component described herein in conjunction with FIGS. 1 and 2, such as the client 205, the storage service 210, and storage service provider 215. In overview, a storage service (e.g., the storage service 210) may receive a request to access data (405). The storage service may obtain portions from storage vectors (410). The storage service may combine portions to generate data (415).

In further detail, the storage service (e.g., the storage service 210) may receive a request to access data (405). The request to access data may include an account identifier corresponding to a user of the client. Using the request, the storage service may identify the storage service providers and storage vectors on which the data for the user is stored. The storage service may access the route table in identifying which storage service providers and which storage vectors.

The storage service may obtain portions from storage vectors (410). The storage service may access the storage service providers and the storage vectors to retrieve the portions of the data stored thereon. Each portion of data may include or correspond to a subset of bits, bytes (e.g., multiple bits), or blocks (e.g., multiple bytes) from the bitstream corresponding to the entirety of the data.

The storage service may combine portions to generate data (415). With the portions of the data, the storage service may reconstruct the entirety of the data for the user. The storage service may combine the portions of the data in accordance to the RAID level. The storage service may traverse through the retrieved portions of the data to identify a type. The type may be one of mirrored, striped, or parity. Based on the type of the portion of the data, the storage service may process the portion to reconstruct the entirety of the data.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for managing storage of data of a user across a plurality of third-party public storage service providers, the method comprising:
   (a) receiving, by a storage service, a request to store data by a user, the storage service configured to communicate with a plurality of third-party public storage service providers, each of the plurality of third-party public storage service providers configured to maintain a plurality of storage vectors;
   (b) identifying, by the storage service, a policy for the user, the policy specifying usage of one or more of the plurality of third-party public storage service providers based at least on a profile of the user;
   (c) determining, by the storage service based at least on the policy, one or more third-party public storage service providers of the plurality of third-party public storage service providers to use to store the data of the user;
   (d) selecting, by the storage service, a first storage vector from the plurality of storage vectors of a first third-party public storage service provider of the one or more third-party public storage service provider, responsive to determining that a location of the user is within a threshold distance of the first storage vector;
   (e) storing, by the storage service, a first portion of the data to the first storage vector selected from the plurality of storage vectors of the first third-party public storage service provider of the one or more third-party public storage service providers; and
   (f) storing, by the storage service, a second portion of the data to one of a second storage vector of a second third-party public storage service provider of the one or more third-party public storage service providers or a storage of the storage service.

2. The method of claim 1, wherein a storage vector of the plurality of storage vectors identifies one of the location, address or a size of a corresponding unit of storage used to select the storage vector from the plurality of storage vectors of a respective third-party public storage service provider.

3. The method of claim 2, wherein (b) further comprises identifying from the profile of the user one of the location of the user, storage size assigned to or requested by the user, or preferences of the user.

4. The method of claim 1, wherein one of the first portion of the data or the second portion of the data comprises one of striped data or mirrored data in association with a respective redundant array of independent disk (RAID) level.

5. The method of claim 1, further comprising obtaining, by the storage service, one of authentication credentials or an address for one of the first storage vector or the second storage vector.

6. The method of claim 1, further comprising storing, by the storage service, the first portion of the data in encrypted form to the first storage vector and the second portion of the data in encrypted form to the second storage vector.

7. The method of claim 1, further comprising storing, by the storage service, the data across different storage vectors across the one or more third-party public storage service providers.

8. The method of claim 1, further comprising receiving, by the storage service, a second request to access the data and responsive to the second request identifying the storage vectors for the data.

9. The method of claim 8, further comprising obtaining, by the storage service, different portions of the data across the storage vectors of the one or more third-party public storage service providers and combining the different portions of the data to provide as a response to the second request.

10. A system for managing storage of data of a user across a plurality of third-party public storage service providers, the system comprising:
a storage service executable on one or more processors, coupled memory and configured to communicate with a plurality of third-party public storage service providers, each of the plurality of third-party public storage service providers configured to maintain a plurality of storage vectors; and
wherein the storage service is configured to:
receive a request to store data by a user;
identify a policy for the user, the policy specifying usage of one of more of the plurality of third-party public storage service providers based at least on a profile of the user;
determine, based at least on the policy, one or more third-party public storage service providers of the plurality of third-party public storage service providers to use to store the data of the user;
select a first storage vector from the plurality of storage vectors of a first third-party public storage service provider of the one or more third-party public storage service provider, responsive to determining that a location of the user is within a threshold distance of the first storage vector;
store a first portion of the data to the first storage vector selected from the plurality of storage vectors of the first third-party public storage service provider of the one or more third-party public storage service providers; and
store a second portion of the data to one of a second storage vector of a second third-party public storage service provider of the one or more third-party public storage service providers or a storage of the storage service.

11. The system of claim 10, wherein a storage vector of the plurality of storage vectors identifies one of the location, address or a size of a corresponding unit of storage used to select the storage vector from the plurality of storage vectors of a respective third-party public storage service provider.

12. The system of claim 11, wherein the profile of the user identifies one of the location of the user, storage size assigned to or requested by the user, or preferences of the user.

13. The system of claim 10, wherein one of the first portion of the data or the second portion of the data comprises one of striped data or mirrored data in association with a respective redundant array of independent disk (RAID) level.

14. The system of claim 10, wherein the storage service is further configured to obtain one of authentication credentials or an address for one of the first storage vector or the second storage vector.

15. The system of claim 10, wherein the storage service is further configured to store the first portion of the data in encrypted form to the first storage vector and the second portion of the data in encrypted form to the second storage vector.

16. The system of claim 10, wherein the storage service is further configured to store the data across different storage vectors across the one or more third-party public storage service providers.

17. The system of claim 10, wherein the storage service is further configured to receive a second request to access the data and responsive to the second request identifying the storage vectors for the data.

18. The system of claim 17, wherein the storage service is further configured to obtain different portions of the data across the storage vectors of the one or more third-party public storage service providers and combining the different portions of the data to provide as a response to the second request.

* * * * *